United States Patent
Tomaszewski et al.

(10) Patent No.: US 6,356,530 B1
(45) Date of Patent: Mar. 12, 2002

(54) NEXT HOP SELECTION IN ATM NETWORKS

(75) Inventors: Marek Tomaszewski, Fremont; Ashok Chippa, San Jose; Ethan Spiegel, Mountain View, all of CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 08/862,915

(22) Filed: May 23, 1997

(51) Int. Cl.⁷ .............................................. H04L 12/26
(52) U.S. Cl. ...................................... 370/232; 370/397
(58) Field of Search .............................. 370/395, 397, 370/399, 227, 230, 232, 233, 234

(56) References Cited

U.S. PATENT DOCUMENTS

| | | |
|---|---|---|
| 4,131,767 A | 12/1978 | Weinstein |
| 4,161,719 A | 7/1979 | Parikh et al. |
| 4,316,284 A | 2/1982 | Howson |
| 4,397,020 A | 8/1983 | Howson |
| 4,419,728 A | 12/1983 | Larson |
| 4,424,565 A | 1/1984 | Larson |
| 4,437,087 A | 3/1984 | Petr |
| 4,438,511 A | 3/1984 | Baran |
| 4,439,763 A | 3/1984 | Limb |
| 4,445,213 A | 4/1984 | Baugh et al. |
| 4,446,555 A | 5/1984 | Devault et al. |
| 4,456,957 A | 6/1984 | Schieltz |
| 4,464,658 A | 8/1984 | Thelen |
| 4,499,576 A | 2/1985 | Fraser |
| 4,506,358 A | 3/1985 | Montgomery |
| 4,507,760 A | 3/1985 | Fraser |
| 4,532,626 A | 7/1985 | Flores et al. |
| 4,644,532 A | 2/1987 | George et al. |
| 4,646,287 A | 2/1987 | Larson et al. |
| 4,677,423 A | 6/1987 | Benvenuto et al. |
| 4,679,189 A | 7/1987 | Olson et al. |

(List continued on next page.)

FOREIGN PATENT DOCUMENTS

| | | |
|---|---|---|
| EP | 0 384 758 A2 | 8/1990 |
| EP | 0 431 751 A1 | 6/1991 |
| EP | 0 567 217 A2 | 10/1993 |
| WO | WO93/07569 | 4/1993 |
| WO | WO93/07692 | 4/1993 |
| WO | WO94/01828 | 1/1994 |
| WO | WO95/20850 | 8/1995 |

OTHER PUBLICATIONS

William Stallings, Data and Computer Communications, pp: 329–333, Prentice Hall, Upper Saddle River, New Jersey 07458.

Allen, M., "Novell IPX Over Various WAN Media (IPXWAN)," Network Working Group, RFC 1551, Dec. 1993, pp. 1–22.

Becker, D., "3c589.c: A 3c589 EtherLink3 ethernet driver for linux," becker@CESDIS.gsfc.nasa.gov, May 3, 1994, pp. 1–13.

(List continued on next page.)

*Primary Examiner*—Melvin Marcelo
*Assistant Examiner*—D. Trinh
(74) *Attorney, Agent, or Firm*—Blakely, Sokoloff, Taylor & Zafman LLP

(57) ABSTRACT

The invention provides a method and system for selecting one particular interface between a pair of adjacent nodes in an ATM network for assignment to a call in that network. The cell rate available on each possible interface is examined and compared with the cell rate expected for the call, and one of the interfaces is selected and assigned responsive to those cell rates. (1) The interface can be chosen which preserves the maximum remaining cell rate for future calls. (2) The interface with the highest-speed available link can be chosen, so long as cell rate capacity is available on that interface for the call.

22 Claims, 2 Drawing Sheets

U.S. PATENT DOCUMENTS

| | | |
|---|---|---|
| 4,679,227 A | 7/1987 | Hughes-Hartogs |
| 4,723,267 A | 2/1988 | Jones et al. |
| 4,731,816 A | 3/1988 | Hughes-Hartogs |
| 4,750,136 A | 6/1988 | Arpin et al. |
| 4,757,495 A | 7/1988 | Decker et al. |
| 4,763,191 A | 8/1988 | Gordon et al. |
| 4,769,810 A | 9/1988 | Eckberg, Jr. et al. |
| 4,769,811 A | 9/1988 | Eckberg, Jr. et al. |
| 4,771,425 A | 9/1988 | Baran et al. |
| 4,819,228 A | 4/1989 | Baran et al. |
| 4,827,411 A | 5/1989 | Arrowood et al. |
| 4,833,706 A | 5/1989 | Hughes-Hartogs |
| 4,835,737 A | 5/1989 | Herrig et al. |
| 4,879,551 A | 11/1989 | Georgiou et al. |
| 4,893,306 A | 1/1990 | Chao et al. |
| 4,903,261 A | 2/1990 | Baran et al. |
| 4,922,486 A | 5/1990 | Lidinsky et al. |
| 4,933,937 A | 6/1990 | Konishi |
| 4,960,310 A | 10/1990 | Cushing |
| 4,962,497 A | 10/1990 | Ferenc et al. |
| 4,962,532 A | 10/1990 | Kasirai et al. |
| 4,965,772 A | 10/1990 | Daniel et al. |
| 4,970,678 A | 11/1990 | Sladowski et al. |
| 4,979,118 A | 12/1990 | Kheradpir .................. 364/436 |
| 4,980,897 A | 12/1990 | Decker et al. |
| 4,991,169 A | 2/1991 | Davis et al. |
| 5,003,595 A | 3/1991 | Collins et al. |
| 5,014,265 A | 5/1991 | Hahne et al. |
| 5,020,058 A | 5/1991 | Holden et al. |
| 5,033,076 A | 7/1991 | Jones et al. |
| 5,054,034 A | 10/1991 | Hughes-Hartogs |
| 5,059,925 A | 10/1991 | Weisbloom |
| 5,072,449 A | 12/1991 | Enns et al. |
| 5,088,032 A | 2/1992 | Bosack |
| 5,095,480 A | 3/1992 | Fenner |
| RE33,900 E | 4/1992 | Howson |
| 5,115,431 A | 5/1992 | Williams et al. |
| 5,115,495 A * | 5/1992 | Tsuchiya et al. ............ 709/239 |
| 5,119,367 A * | 6/1992 | Kawakatsu et al. ......... 370/232 |
| 5,128,926 A * | 7/1992 | Perlman et al. ............. 370/248 |
| 5,128,945 A | 7/1992 | Enns et al. |
| 5,136,580 A | 8/1992 | Videlock et al. |
| 5,166,930 A | 11/1992 | Braff et al. |
| 5,189,662 A * | 2/1993 | Kleine-Altekamp ........ 370/227 |
| 5,199,049 A | 3/1993 | Wilson |
| 5,206,886 A | 4/1993 | Bingham |
| 5,208,811 A | 5/1993 | Kashio et al. |
| 5,212,686 A | 5/1993 | Joy et al. |
| 5,224,099 A | 6/1993 | Corbalis et al. |
| 5,226,120 A | 7/1993 | Brown et al. |
| 5,228,062 A | 7/1993 | Bingham |
| 5,229,994 A | 7/1993 | Balzano et al. |
| 5,233,604 A * | 8/1993 | Ahmadi et al. ............. 370/238 |
| 5,237,564 A | 8/1993 | Lespagnol et al. |
| 5,241,682 A | 8/1993 | Bryant et al. |
| 5,243,342 A | 9/1993 | Kattemalalavadi et al. |
| 5,243,596 A | 9/1993 | Port et al. |
| 5,247,516 A | 9/1993 | Bernstein et al. |
| 5,249,178 A | 9/1993 | Kurano et al. |
| 5,253,251 A | 10/1993 | Aramaki |
| 5,255,291 A | 10/1993 | Holden et al. |
| 5,260,933 A | 11/1993 | Rouse |
| 5,260,978 A | 11/1993 | Fleischer et al.. |
| 5,268,592 A | 12/1993 | Bellamy et al. |
| 5,268,900 A | 12/1993 | Hluchyj et al. |
| 5,271,004 A | 12/1993 | Proctor et al. |
| 5,274,631 A | 12/1993 | Bhardwaj |
| 5,274,635 A | 12/1993 | Rahman et al. |
| 5,274,643 A | 12/1993 | Fisk |
| 5,280,470 A | 1/1994 | Buhrke et al. |
| 5,280,480 A | 1/1994 | Pitt et al. |
| 5,280,500 A | 1/1994 | Mazzola et al. |
| 5,283,783 A | 2/1994 | Nguyen et al. |
| 5,287,103 A | 2/1994 | Kasprzyk et al. |
| 5,287,453 A | 2/1994 | Roberts |
| 5,291,482 A | 3/1994 | McHarg et al. |
| 5,305,311 A | 4/1994 | Lyles |
| 5,307,343 A | 4/1994 | Bostica et al. |
| 5,309,437 A | 5/1994 | Perlman et al. .......... 730/85.13 |
| 5,311,509 A | 5/1994 | Heddes et al. |
| 5,313,454 A | 5/1994 | Bustini et al. |
| 5,313,582 A | 5/1994 | Hendel et al. |
| 5,317,562 A | 5/1994 | Nardin et al. |
| 5,319,644 A | 6/1994 | Liang |
| 5,327,421 A | 7/1994 | Hiller et al. |
| 5,331,637 A | 7/1994 | Francis et al. |
| 5,345,445 A | 9/1994 | Hiller et al. |
| 5,345,446 A | 9/1994 | Hiller et al. |
| 5,359,592 A | 10/1994 | Corbalis et al. |
| 5,361,250 A | 11/1994 | Nguyen et al. |
| 5,361,256 A | 11/1994 | Doeringer et al. |
| 5,361,259 A | 11/1994 | Hunt et al. |
| 5,365,524 A | 11/1994 | Hiller et al. |
| 5,367,517 A | 11/1994 | Cidon et al. |
| 5,371,852 A | 12/1994 | Attanasio et al. |
| 5,386,567 A | 1/1995 | Lien et al. |
| 5,390,170 A | 2/1995 | Sawant et al. |
| 5,390,175 A | 2/1995 | Hiller et al. |
| 5,394,394 A | 2/1995 | Crowther et al. |
| 5,394,402 A | 2/1995 | Ross |
| 5,400,325 A | 3/1995 | Chatwani et al. |
| 5,408,469 A | 4/1995 | Opher et al. |
| 5,416,842 A | 5/1995 | Aziz |
| 5,422,880 A | 6/1995 | Heitkamp et al. |
| 5,422,882 A | 6/1995 | Hiller et al. |
| 5,423,002 A | 6/1995 | Hart |
| 5,426,636 A | 6/1995 | Hiller et al. |
| 5,428,607 A | 6/1995 | Hiller et al. |
| 5,430,715 A | 7/1995 | Corbalis et al. |
| 5,430,729 A | 7/1995 | Rahnema |
| 5,442,457 A | 8/1995 | Najafi |
| 5,442,630 A | 8/1995 | Gagliardi et al. |
| 5,452,294 A * | 9/1995 | Natarajan .................... 370/351 |
| 5,452,297 A | 9/1995 | Hiller et al. |
| 5,473,599 A | 12/1995 | Li et al. |
| 5,473,607 A | 12/1995 | Hausman et al. |
| 5,477,541 A | 12/1995 | White et al. |
| 5,485,455 A | 1/1996 | Dobbins et al. |
| 5,490,140 A | 2/1996 | Abensour et al. |
| 5,490,258 A | 2/1996 | Fenner |
| 5,491,687 A | 2/1996 | Christensen et al. |
| 5,491,804 A | 2/1996 | Heath et al. |
| 5,497,368 A | 3/1996 | Reijnierse et al. |
| 5,504,747 A | 4/1996 | Sweasey |
| 5,509,006 A | 4/1996 | Wilford et al. |
| 5,517,494 A | 5/1996 | Green |
| 5,519,704 A | 5/1996 | Farinacci et al. |
| 5,519,858 A | 5/1996 | Walton et al. ............... 395/600 |
| 5,526,489 A | 6/1996 | Nilakantan et al. |
| 5,530,963 A | 6/1996 | Moore et al. |
| 5,535,195 A | 7/1996 | Lee |
| 5,539,734 A | 7/1996 | Burwell et al. |
| 5,541,911 A | 7/1996 | Nilakantan et al. |
| 5,546,370 A | 8/1996 | Ishikawa |
| 5,555,244 A | 9/1996 | Gupta et al. |
| 5,561,669 A | 10/1996 | Lenney et al. |
| 5,583,862 A | 12/1996 | Callon |
| 5,592,470 A | 1/1997 | Rudrapatna et al. |
| 5,598,581 A | 1/1997 | Daines et al. |
| 5,600,798 A | 2/1997 | Cherukuri et al. |
| 5,604,868 A | 2/1997 | Komine et al. |

| | | |
|---|---|---|
| 5,608,726 A | 3/1997 | Virgile |
| 5,617,417 A | 4/1997 | Sathe et al. |
| 5,617,421 A | 4/1997 | Chin et al. |
| 5,630,125 A | 5/1997 | Zellweger |
| 5,631,908 A | 5/1997 | Saxe |
| 5,632,021 A | 5/1997 | Jennings et al. |
| 5,634,010 A | 5/1997 | Ciscon et al. |
| 5,638,359 A | 6/1997 | Peltola et al. |
| 5,644,718 A | 7/1997 | Belove et al. |
| 5,659,684 A | 8/1997 | Giovannoni et al. |
| 5,666,353 A | 9/1997 | Klausmeier et al. |
| 5,673,265 A | 9/1997 | Gupta et al. |
| 5,678,006 A | 10/1997 | Valizadeh et al. |
| 5,680,116 A | 10/1997 | Hashimoto et al. |
| 5,684,797 A | 11/1997 | Aznar et al. |
| 5,687,324 A | 11/1997 | Green et al. |
| 5,689,506 A | 11/1997 | Chiussi et al. |
| 5,694,390 A | 12/1997 | Yamato et al. |
| 5,724,351 A | 3/1998 | Chao et al. |
| 5,748,186 A | 5/1998 | Raman |
| 5,748,617 A | 5/1998 | McLain, Jr. |
| 5,754,547 A | 5/1998 | Nakazawa |
| 5,802,054 A | 9/1998 | Bellenger |
| 5,835,710 A | 11/1998 | Nagami et al. |
| 5,854,903 A | 12/1998 | Morrison et al. |
| 5,856,981 A | 1/1999 | Voelker |
| 5,892,924 A | 4/1999 | Lyon et al. ............ 395/200.75 |
| 5,898,686 A | 4/1999 | Virgile |
| 5,903,559 A | 5/1999 | Acharya et al. |
| 6,167,030 A * | 12/2000 | Kilkki et al. ............... 370/236 |

OTHER PUBLICATIONS

Chowdhury, et al., "Alternative Bandwitdth Allocation Algorithms for Packet Video in ATM Networks," INFOCOM 1992, PP. 1061–1068.

Doeringer, W., "Routing on Longest–Matching Prefixes," IEEE/ACM Transactions in Networking, vol. 4, No. 1, Feb. 1996, pp. 86–97.

Esaki, et al., "Datagram Delivery in an ATM–Internet," 2334b IEICE Transactions on Communications, Mar. 1994, No. 3, Tokyo, Japan.

IBM Corporation, "Method and Apparatus for the Statistical Multiplexing of Voice, Data and Image Signals," IBM Technical Disclosure Bulletin, No. 6, Nov. 1992, pp.409–411.

Pei, et al., "Putting Routing Tables in Silicon," IEEE Network Magazine, Jan. 1992, pp. 42–50.

Perkins, D., "Requirements for an Internet Standard Point–to–Point Protocol," Network Working Group, RFC 1547, Dec. 1993, pp. 1–19.

Simpson, W., "The Point–toPoint Protocol (PPP)," Network Working Group, RFC 1548, Dec. 1993, pp. 1–53.

Tsuchiya, P. F., "A Search Algorithm for Table Entries with Non–Contigious Wildcarding," Abstract, Bellcore.

Zhang, et al., "Rate–Controlled Static–Priority Queueing," INFOCOM 1993, pp. 227–236.

* cited by examiner

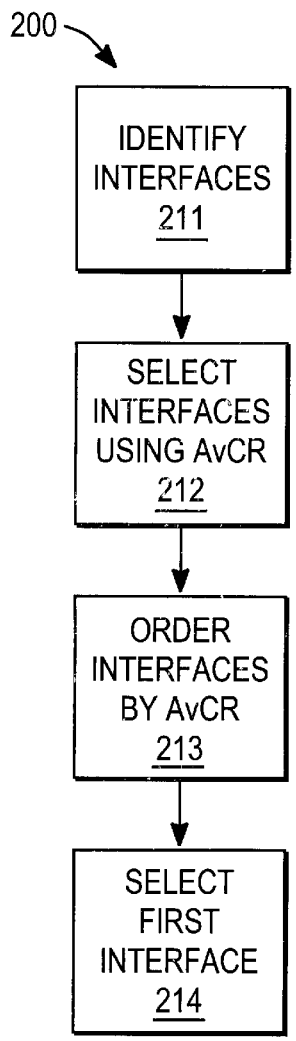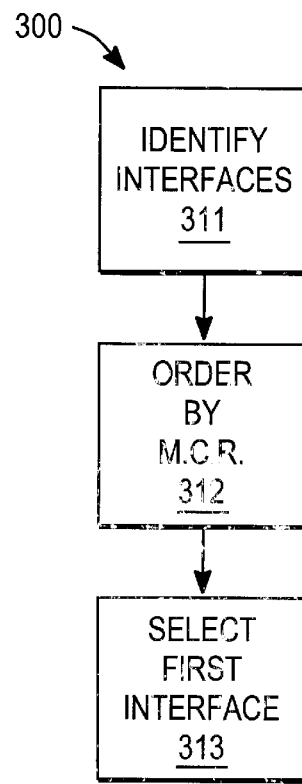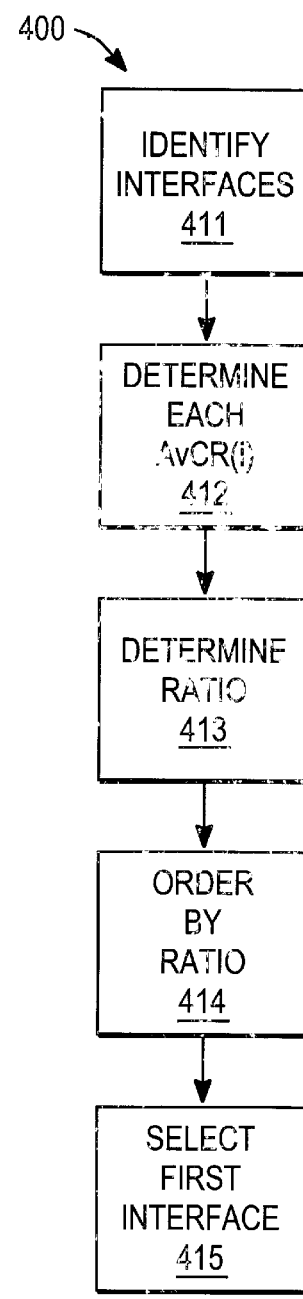
FIG. 2
FIG. 3
FIG. 4

NEXT HOP SELECTION IN ATM NETWORKS

BACKGROUND OF THE INVENTION

1. Field of the Invention

The invention relates to ATM networks.

2. Related Art

In known ATM systems, each call is routed in a virtual circuit which is specified by the sending node. This circuit includes a plurality of ATM switches in a virtual circuit from the sending node to the receiving node. If two adjacent nodes in the virtual circuit have more than one interface connecting them, one of the plurality of interfaces must be specifically chosen and assigned to the call.

In some instances, the interface is specified by the sending node. However, when the particular interface is not specified by the sending node, the two adjacent nodes must select one of the plurality of interfaces. In known ATM systems, one interface is selected by round-robin assignment. While this method is effective to unambiguously select one of the plurality of interfaces, it has the drawback that the selected interface can be inappropriate for optimal call routing.

Accordingly, it would be desirable to provide a method and system for selecting one particular interface, which is more appropriate for optimal call routing. This advantage is achieved in an embodiment of the invention in which relative bandwidth or another characteristic of the plurality of interfaces, and in which relative size or another characteristic of the call, are examined and taken into account when one interface is specifically chosen and assigned to the call.

SUMMARY OF INVENTION

The invention provides a method and system for selecting one particular interface between a pair of adjacent nodes in an ATM network for assignment to a call in that network. The cell rate available on each possible interface is examined and compared with the cell rate expected for the call, and one of the interfaces is selected and assigned responsive to those cell rates.

In a first preferred embodiment, the interface is chosen which preserves the maximum remaining cell rate for future calls. In a second preferred embodiment, the interface with the highest-speed available link is chosen, so long as cell rate capacity is available on that interface for the call.

BRIEF DESCRIPTION OF THE DRAWINGS

FIG. 2 shows a process flow diagram of a first method for selecting an interface for assignment to a call.

FIG. 3 shows a process flow diagram of a second method for selecting an interface for assignment to a call.

FIG. 4 shows a process flow diagram of a third method for selecting an interface for assignment to a call.

DETAILED DESCRIPTION OF THE PREFERRED EMBODIMENT

Figure 1:
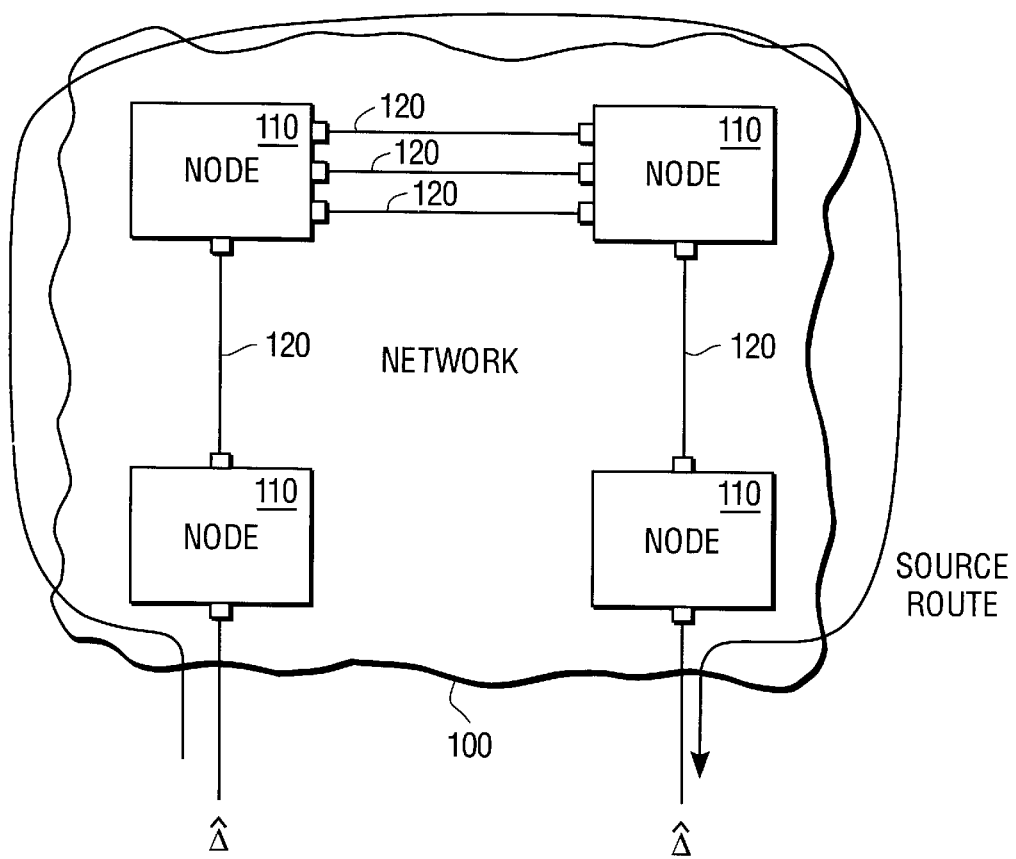
FIG. 1 shows a block diagram of an ATM network.

In the following description, a preferred embodiment of the invention is described with regard to preferred process steps and data structures. Those skilled in the art would recognize after perusal of this application that embodiments of the invention can be implemented using general purpose switching processors or special purpose switching processors or other circuits adapted to particular process steps and data structures described herein, and that implementation of the process steps and data structures described herein would not require undue experimentation or further invention.

Inventions described herein can be used in conjunction with inventions described in the following application:

Application No. 08/863,031, filed May 23, 1997, in the name of the same inventors, entitled Call Size Feedback on PNNI Operation, which issued as U.S. Pat. No. 6,122,272 on Sep. 19, 2000 and is assigned to the same assignee as the present application.

This application is hereby incorporated by reference as if fully set forth herein.

ATM Network Including Multiple Interfaces Between Adjacent Nodes

FIG. 1 shows a block diagram of an ATM network.

An ATM network 100 includes a plurality of ATM nodes 110, each of which is capable of transmitting ATM cells from a sending node 110 to a designated receiving node 110. Each pair of adjacent nodes 110 has at least one, and possibly more than one, interface 120. Each interface 120 is capable of transmitting ATM cells from a first adjacent node 110 to a second adjacent node 110.

When an incoming call is received at the sending node 110, that incoming call specifies a virtual circuit for the call, including the sending node 110, the designated receiving node 110, and a designated sequence of intermediate nodes 110, for transmitting ATM cells for the call from the sending node 110 to the receiving node 110. The incoming call may also specify other information about the call, such as a required cell transmission rate for the call.

When the virtual circuit for the call is set up, there may be one or more pairs of adjacent nodes 110 which have a plurality of interfaces 120 therebetween. In some cases, the incoming call will specify which of the interfaces 120 is to be included in the virtual circuit. In those case where the incoming call does not so specify, one of the methods shown herein is used to select one of the interfaces 120 for inclusion in the virtual circuit and thus for assignment to the call.

In preferred embodiments, the cell rate available on each possible interface is examined and compared with the cell rate expected for the call, and one of the interfaces is selected and assigned responsive to those cell rates.

First Method for Selecting Interface

FIG. 2 shows a process flow diagram of a first method for selecting an interface for assignment to a call.

A first method 200 applies to CBR (constant bit rate), RT-VBR (real time variable bit rate), and NRT-VBR (non-real time variable bit rate) traffic classes in an ATM network. The first method 200 includes the steps 211 through 214.

At a step 211, the method 200 identifies a plurality of interfaces 120 between the first adjacent node 110 and the second adjacent node 110.

At a step 212, the method 200 selects, from the interfaces 120 identified in the step 211, the ones which have sufficient AvCR (available cell rate) for the incoming call.

At a step 213, the method 200 orders the interfaces 120 selected in the step 212 in increasing order of AvCR.

At a step 214, the method 200 selects the first interface 120 in an ordered list generated by the step 213.

The first method thus choses the interface which preserves the maximum remaining cell rate for future calls.

Second Method for Selecting Interface

FIG. 3 shows a process flow diagram of a second method for selecting an interface for assignment to a call.

A second method 300 also applies to CBR (constant bit rate), RT-VBR (real time variable bit rate), and NRT-VBR (non-real time variable bit rate) traffic classes in an ATM network. The second method 300 includes the steps 311 through 313.

At a step 311 (like the step 211 performed by the method 200), the method 300 identifies a plurality of interfaces 120 between the first adjacent node 110 and the second adjacent node 110.

At a step 312, the method 300 orders the interfaces 120 identified in the step 311 in decreasing order of Maximum Cell Rate.

At a step 313, the method 300 selects the first interface 120 in an ordered list generated by the step 312.

The second method 300 thus choses the interface with the highest-speed available link is chosen, so long as cell rate capacity is available on that interface for the call.

Third Method for Selecting Interface

FIG. 4 shows a process flow diagram of a third method for selecting an interface for assignment to a call.

A third method 400 applies to ABR (available bit rate) and UBR (unspecified bit rate) traffic classes in an ATM network. The third method 400 includes the steps 411 through 414.

At a step 411 (like the step 211 performed by the method 200), the method 400 identifies a plurality of interfaces 120 between the first adjacent node 110 and the second adjacent node 110.

At a step 412, for each interface 120i identified in the step 411, the method 400 determines the Available Cell Rate AvCR(i). The available cell rate is determined by subtracting, from the Maximum Cell Rate, the amount of bandwidth already reserved for that interface 120.

At a step 413, for each interface 120i identified in the step 411, the method 400 determines the ratio AvCR(i)/(Ni+1), where Ni is the number of actual "best effort" virtual circuits which are using the interface 120 i.

At a step 414, the method 400 orders the interfaces identified in the step 411 in decreasing order of the ratio determined in the step 413.

At a step 415, the method 400 selects the first interface 120 in an ordered list generated by the step 414.

The third method 400 thus choses the interface which best balances the load of multiple calls across multiple interfaces, after subtracting reserved bandwidth from each interface.

Alternative Embodiments

Although preferred embodiments are disclosed herein, many variations are possible which remain within the concept, scope, and spirit of the invention, and these variations would become clear to those skilled in the art after perusal of this application.

What is claimed is:

1. A method comprising:
   receiving a request for a virtual circuit in a node of a switching network;
   retrieving an available cell rate to accommodate said virtual circuit for each interface of a plurality of interfaces between said node and a second node of said switching network, said second node being adjacent to said first node;
   selecting said each interface having said available cell rate higher than a transmission cell rate for said virtual circuit; and
   selecting an optimum interface from said each interface selected for inclusion in said virtual circuit, said optimum interface having a lowest available cell rate of said available cell rate of said each interface selected.

2. The method according to claim 1, wherein said switching network is an ATM network accommodating a constant bit rate (CBR) traffic class.

3. The method according to claim 1, wherein said switching network is an ATM network accommodating a real time variable bit rate (RT-VBR) traffic class.

4. The method according to claim 1, wherein said switching network is an ATM network accommodating a non real time variable bit rate (NTR-VBR) traffic class.

5. A method comprising:
   receiving a request for a virtual circuit in a node of a switching network;
   retrieving an available cell rate to accommodate said virtual circuit for each interface of a plurality of interfaces between said node and a second node of said switching network, said second node being adjacent to said first node, said each interface having a transmission speed rate;
   selecting said each interface having said available cell rate higher than a transmission cell rate for said virtual circuit; and
   selecting an optimum interface from said each interface selected for inclusion in said virtual circuit, said optimum interface having a highest transmission speed rate of said transmission speed rate of said each interface selected.

6. The method according to claim 5, wherein said switching network is an ATM network accommodating a constant bit rate (CBR) traffic class.

7. The method according to claim 5, wherein said switching network is an ATM network accommodating a real time variable bit rate (RT-VBR) traffic class.

8. The method according to claim 5, wherein said switching network is an ATM network accommodating a non real time variable bit rate (NTR-VBR) traffic class.

9. A method comprising:
   receiving a request for a virtual circuit in a node of a switching network;
   retrieving an available cell rate to accommodate said virtual circuit for each interface of a plurality of interfaces between said node and a second node of said switching network, said second node being adjacent to said first node;
   calculating a ratio for said each interface, as said available cell rate divided by at least one existent virtual circuit in said each interface; and
   selecting an optimum interface from said each interface for inclusion in said virtual circuit, said optimum interface having a highest ratio of said ratio of said each interface.

10. The method according to claim 9, wherein said switching network is an ATM network accommodating an available bit rate (ABR) traffic class.

11. The method according to claim 9, wherein said switching network is an ATM network accommodating an unspecified bit rate (UBR) traffic class.

12. A system comprising:
   a first node in a switching network to receive a request for a virtual circuit; and
   a second node in said switching network, adjacent to said first node and coupled to said first node through a plurality of interfaces;
   said first node to retrieve an available cell rate to accommodate said virtual circuit for each interface of said plurality of interfaces, to select said each interface having said available cell rate higher than a transmission cell rate for said virtual circuit, and to select an optimum interface from said each interface selected, said optimum interface having a lowest available cell rate of said available cell rate of said each interface selected.

13. The system according to claim 12, wherein said switching network is an ATM network accommodating a constant bit rate (CBR) traffic class.

14. The system according to claim 12, wherein said switching network is an ATM network accommodating a real time variable bit rate (RT-VBR) traffic class.

15. The system according to claim 12, wherein said switching network is an ATM network accommodating a non real time variable bit rate (NTR-VBR) traffic class.

16. A system comprising:

a first node in a switching network to receive a request for a virtual circuit; and a second node in said switching network, adjacent to said first node and coupled to said first node through a plurality of interfaces;

said first node to retrieve an available cell rate to accommodate said virtual circuit for each interface of said plurality of interfaces, said each interface having a transmission speed rate, to select said each interface having said available cell rate higher than a transmission cell rate for said virtual circuit, and to select an optimum interface from said each interface selected, said optimum interface having a highest transmission speed rate of said transmission speed rate of said each interface selected.

17. The system according to claim 16, wherein said switching network is an ATM network accommodating a constant bit rate (CBR) traffic class.

18. The system according to claim 16, wherein said switching network is an ATM network accommodating a real time variable bit rate (RT-VBR) traffic class.

19. The system according to claim 16, wherein said switching network is an ATM network accommodating a non real time variable bit rate (NTR-VBR) traffic class.

20. A system comprising:

a first node in a switching network to receive a request for a virtual circuit; and a second node in said switching network, adjacent to said first node and coupled to said first node through a plurality of interfaces;

said first node to retrieve an available cell rate to accommodate said virtual circuit for each interface of said plurality of interfaces, to calculate a ratio for said each interface, as said available cell rate divided by at least one existent virtual circuit in said each interface, and to select said optimum interface having a highest ratio of said ratio of said each interface.

21. The system according to claim 20, wherein said switching network is an ATM network accommodating an available bit rate (ABR) traffic class.

22. The system according to claim 20, wherein said switching network is an ATM network accommodating an unspecified bit rate (UBR) traffic class.

* * * * *